US007534083B2

(12) United States Patent
Trudeau et al.

(10) Patent No.: US 7,534,083 B2
(45) Date of Patent: May 19, 2009

(54) TRAILER OPERABLE IN LOWERED AND RAISED TRANSPORT POSITIONS

(76) Inventors: Andre Trudeau, Box 325, Ile-des-Chenes, Manitoba, R0A 0T0 (CA); Claude Trudeau, Box 325, Ile-des-Chenes, Manitoba, R0A 0T0 (CA)

( * ) Notice: Subject to any disclaimer, the term of this patent is extended or adjusted under 35 U.S.C. 154(b) by 188 days.

(21) Appl. No.: 11/217,606

(22) Filed: Sep. 2, 2005

(65) Prior Publication Data
US 2007/0065263 A1   Mar. 22, 2007

(51) Int. Cl.
*B60P 1/04*   (2006.01)
(52) U.S. Cl. .......................... 414/483; 414/482
(58) Field of Classification Search ................ 414/481, 414/495, 540, 482–483; 280/789
See application file for complete search history.

(56) References Cited

U.S. PATENT DOCUMENTS

| 2,762,631 | A | | 9/1956 | Entz | |
|---|---|---|---|---|---|
| 3,335,887 | A | | 8/1967 | Snook | |
| 3,931,895 | A | * | 1/1976 | Grimaldo | 414/678 |
| 4,003,583 | A | * | 1/1977 | Stanzel | 280/43.22 |
| 4,008,902 | A | | 2/1977 | Dill | |
| 4,286,800 | A | * | 9/1981 | Lomas | 280/414.1 |
| 4,902,188 | A | * | 2/1990 | Page | 414/495 |
| 4,943,202 | A | | 7/1990 | Galloway | |
| 5,405,236 | A | * | 4/1995 | Sundstrom et al. | 414/495 |
| 5,433,578 | A | * | 7/1995 | Honan | 414/476 |
| 6,059,263 | A | * | 5/2000 | Otema et al. | 254/89 H |
| 6,113,130 | A | * | 9/2000 | Saulce | 280/656 |
| 6,135,700 | A | | 10/2000 | Collins | |
| 6,273,435 | B1 | * | 8/2001 | Stringer | 280/6.151 |
| 6,648,578 | B1 | * | 11/2003 | Rouse | 414/482 |
| 6,857,643 | B2 | * | 2/2005 | Neider | 280/43.18 |
| 7,153,080 | B2 | * | 12/2006 | Schmidt | 414/482 |
| 2004/0197176 | A1 | * | 10/2004 | Pate | 414/495 |
| 2006/0045697 | A1 | * | 3/2006 | Zug et al. | 414/495 |

FOREIGN PATENT DOCUMENTS

CA    1283673    5/1987

* cited by examiner

*Primary Examiner*—Saúl J Rodríguez
*Assistant Examiner*—Joshua I Rudawitz
(74) *Attorney, Agent, or Firm*—Ade & Company Inc.; Ryan W. Dupuis; Kyle R. Satterthwaite

(57) ABSTRACT

A trailer includes a deck frame which can be supported in a lowered transport position in which the deck frame is spaced above the ground below a height of the wheels corresponding to a deck between configuration and a raised transport position in which the deck frame is spaced above the ground substantially at or above the height of the wheels corresponding to a deck over configuration. Consumers are thus only required to purchase a single trailer to meet the advantages of both trailer configurations. Load supports, independent of a lift mechanism of the trailer, are provided in addition to the linkage which controls displacement of the deck frame between the two positions to ensure that the deck frame is supported on the wheels in a manner so as to safely bear a load on the deck frame in both the lowered and raised positions.

20 Claims, 10 Drawing Sheets

TRAILER OPERABLE IN LOWERED AND RAISED TRANSPORT POSITIONS

FIELD OF THE INVENTION

The present invention relates to a trailer of the type having a flat deck which can be positioned in raised and lowered positions, and more particularly relates to trailer operable to support a load in both the raised and lowered positions in which the lowered position corresponds to a deck height below the wheel height and in which the raised position corresponds to a deck height substantially at or above the wheel height.

BACKGROUND

Open deck trailers for being towed behind a towing vehicle are commonly available in two varieties. One variety is a deck over configuration in which the deck surface of the trailer is positioned at or above the wheel height of the trailer so that the deck surface is continuous across the wheels. This type of trailer is convenient for side loading the trailer with pallets from a fork lift for instance as the weight of the material loaded onto the trailer can be centered at the wheel axle without interference of the wheel height interrupting the deck surface.

Alternatively, trailers are available in a deck between configuration in which the deck surface is recessed below a height of the wheels and spans between the wheels, thus limiting the overall width of the deck surface at the wheel location. This configuration is particularly useful for lowering the overall height of the deck surface to permit more convenient loading as a ramp when positioning a vehicle on the trailer for instance and for lowering the overall height of the load on the trailer.

To assist in lowering the deck height for loading, many trailers are known to have wheels supported on a bell crank arrangement operated by a lift cylinder to control the wheel height. Various examples are disclosed in U.S. Pat. No. 4,943,202 to Galloway, U.S. Pat. No. 6,135,700 to Collins, U.S. Pat. No. 4,008,902 to Dill, U.S. Pat. No. 2,762,631 to Entz and U.S. Pat. No. 3,335,887 to Snook. In each instance however the load of the trailer is carried by the lift cylinder of the bell crank arrangement so that safe operation is fully dependent upon the proper operation of the lift cylinder. In general no additional load support is provided separate of the lift cylinder to safely ensure that the deck is properly supported in relation so the wheels. Furthermore, all of the above examples permit only a single transport height and cannot be operated in either a deck over configuration or a deck between configuration in use. Consumers are thus required to purchase two separate trailer configurations if features of both a deck over configuration and a deck between configuration are desired.

Canadian patent 1,283,673 to Orr discloses a trailer in which the deck frame is similarly supported on the wheels by a bell crank arrangement dependent upon a lift cylinder to control height of the deck relative to the wheels. The trailer cannot be operated in a deck over configuration. As there is no additional load support, the load being carried relies heavily on the lift mechanism in order to avoid failure.

SUMMARY OF THE INVENTION

According to one aspect of the invention there is provided a trailer comprising:
a hitch connector for connection to a towing vehicle;
a deck frame for bearing a load thereon;
wheels;
a linkage supporting the deck frame on the wheels for relative movement between a lowered transport position in which the deck frame is spaced above the ground below a height of the wheels and a raised transport position in which the deck frame is spaced above the ground substantially at or above the height of the wheels; and
load supports supporting the deck frame on the wheels so as to be arranged to bear a load on the deck frame in both the lowered transport position and the raised transport position for rolling movement along the ground.

By providing a linkage which supports the deck frame in either a lowered transport position comprising a deck between configuration and a raised transport position comprising a deck over configuration consumers are only required to purchase a single trailer to meet the advantages of both trailer configurations. The use of load supports in addition to the linkage ensures that the deck frame is supported on the wheels in a manner so as to bear a load on the deck frame in both the lowered and raised positions. The load supports further ensure that the trailer is much safer to operate as it is not dependent upon a lift mechanism, for example a hydraulic lift cylinder or the like, to prevent failure and potential excessive damage to the trailer or surrounding property in use.

The linkage is preferably rotated over-centre between the lowered transport position and the raised transport position.

The wheels are preferably supported on a common base frame wherein the linkage comprises a 4-bar linkage coupled between the base frame and the deck frame. The wheels are preferably connected to the common base frame by respective torsion axles.

Pivoting links of the linkage are preferably near horizontal in the lowered transport position. In this instance, preferably there is provided a lift mechanism for lifting the deck frame in the lowered position relative to the wheels.

The lift mechanism may be operatively connected between the base frame and the deck frame, in rolling contact with at least one of the base frame and the deck frame.

Preferably the load supports support the deck frame for bearing a load independently of the lift mechanism.

In the lowered transport position, the load supports preferably comprise a portion of the base frame which supports the deck frame directly thereon.

In the raised transport position, the load supports preferably comprise stops on the linkage which prevent rotation beyond the raised transport position.

In the raised transport position, the load supports preferably also comprise rigid posts extending downwardly and forwardly from the deck frame to the base frame so as to prevent rotation of the linkage beyond the raised transport position. The rigid posts may be telescopically extended in the lowered transport position in relation to the raised transport position.

Preferably the linkage is pivoted upwardly and forwardly from the lowered transport position to the raised transport position.

The trailer preferably includes brakes for braking rotation of the wheels for displacing the deck frame between the lowered transport position and the raised transport position with a towing vehicle.

There may be provided a latch mechanism which latches the deck frame in the raised transport position and which is biased into latching engagement.

The latch mechanism may comprise a plurality of latch members operatively connected to a common release mechanism for simultaneously releasing engagement of all of the latch members.

The release mechanism may include a catch which selectively maintains the latch mechanism in a released position.

When the base frame includes fenders supported thereon above the wheels respectively, preferably there is provided a clearance gap between the fenders and the deck frame in both the lowered transport position and the raised transport position.

The deck frame preferably includes decking material thereon which lies substantially flush at a top side thereof with a top side of the fenders.

The linkage may comprise a parallel linkage which maintains the deck frame in horizontal orientation in both the lowered transport position and the raised transport position.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
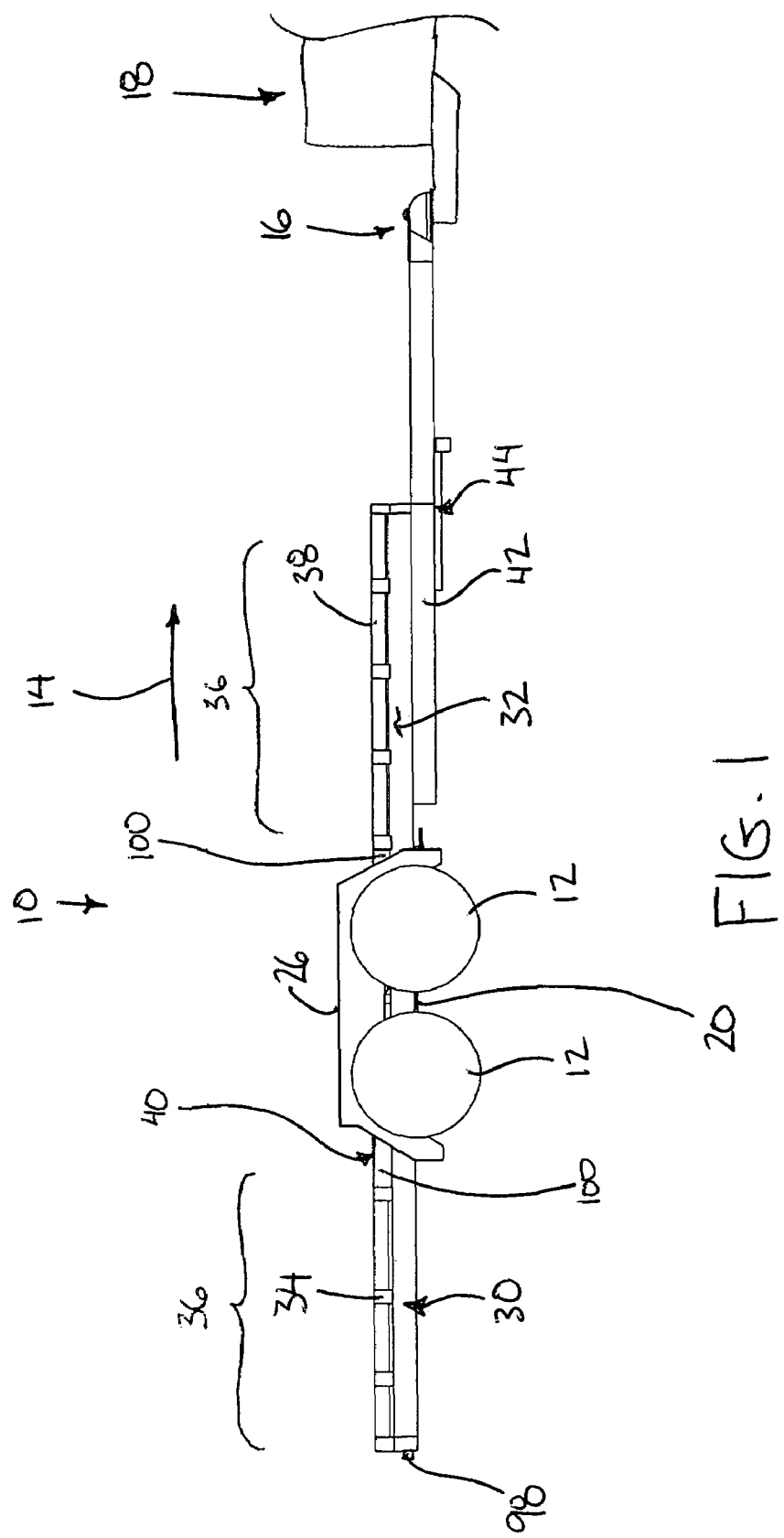
FIG. 1 is a side elevational view of the trailer in lowered transport position.
Figure 2:
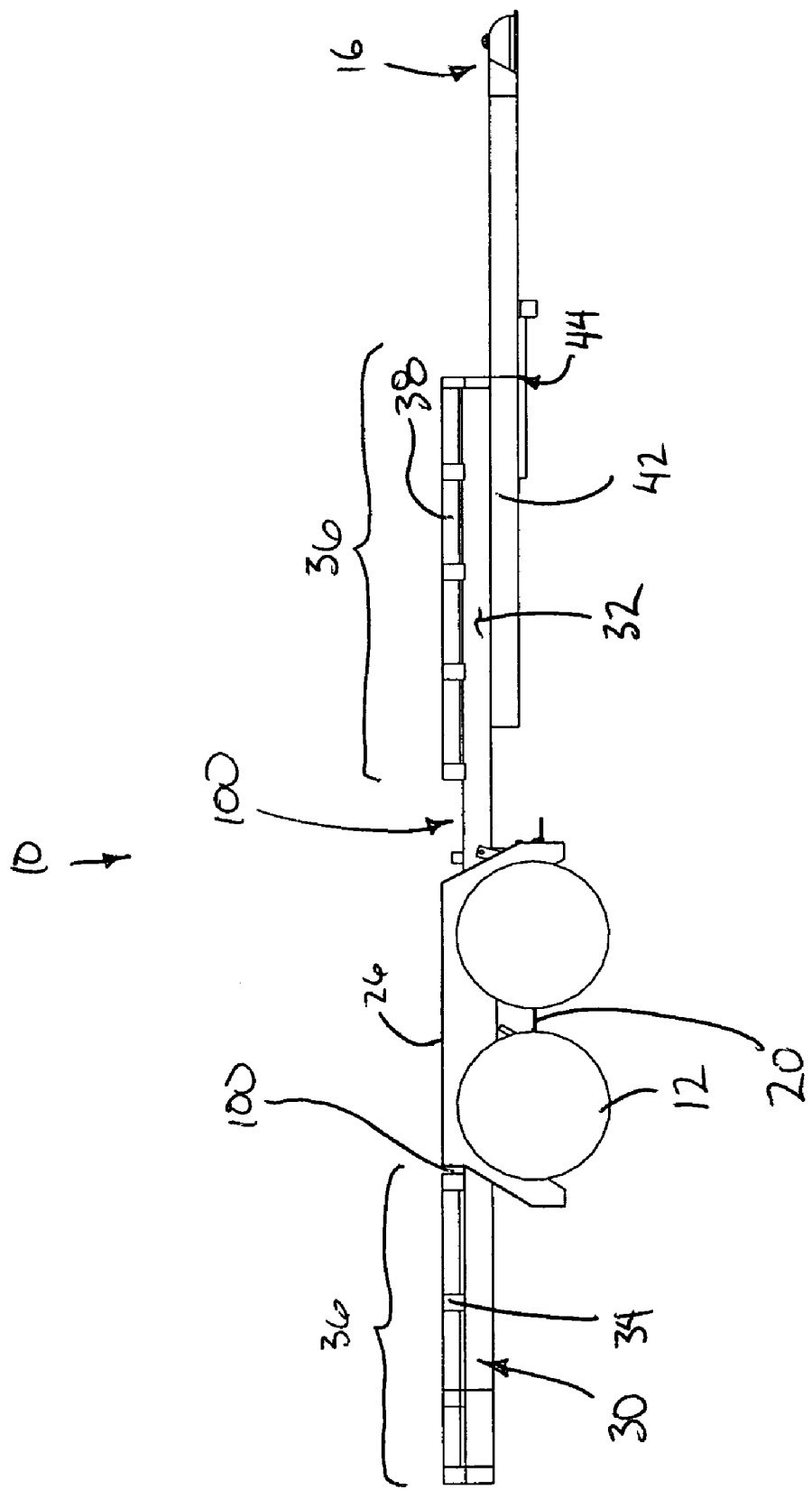
FIG. 2 is a side elevational view of the trailer in a raised transport position.
Figure 3:
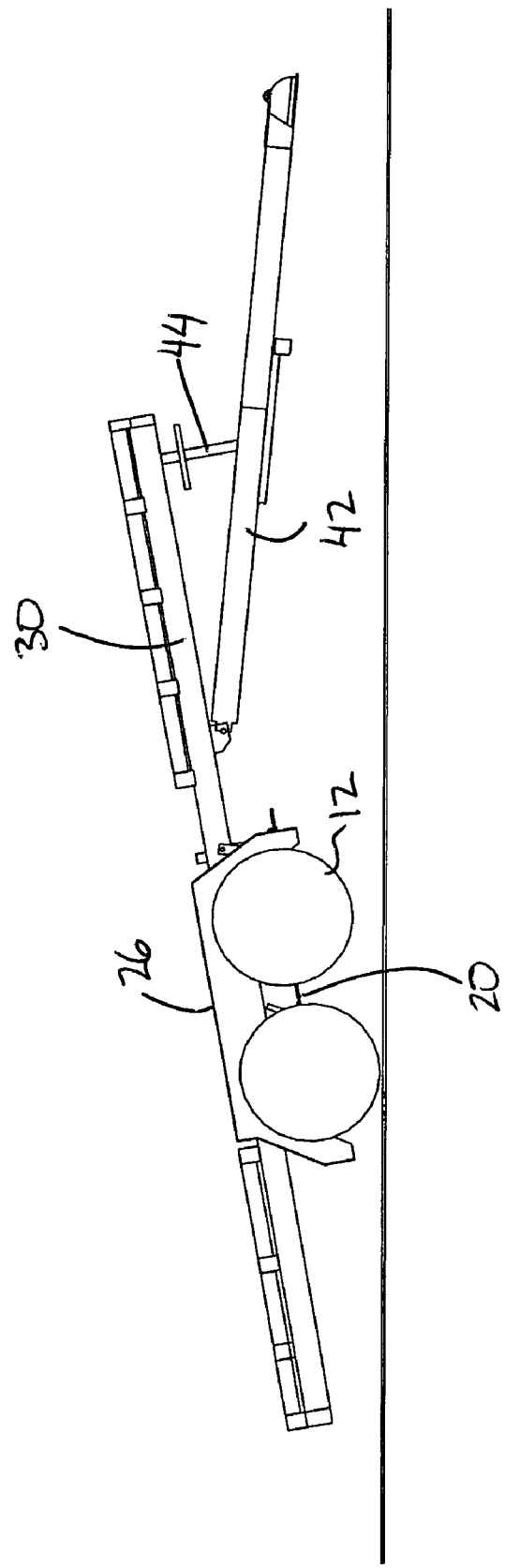
FIG. 3 is side elevational view of the trailer in which the hitch connector of the trailer has been pivoted to tilt the trailer deck.
Figure 4:
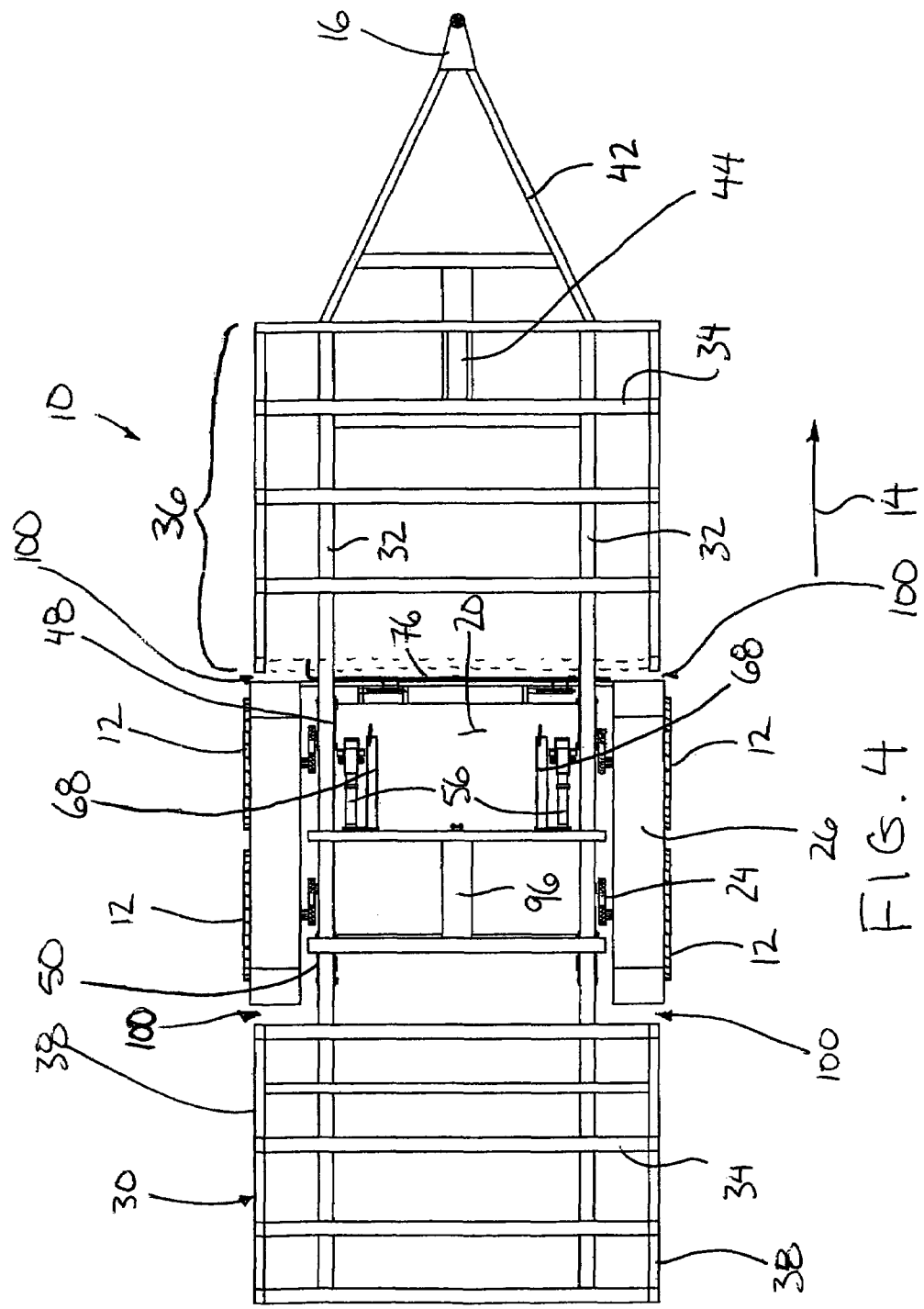
FIG. 4 is a top plan view of the trailer.

Referring to the accompanying figures there is illustrated a trailer generally indicated by reference numeral 10. The trailer 10 comprises a deck type trailer which is convertible between a lowered transport position comprising a deck between configuration as shown in FIG. 1 and a raised transport position comprising a deck over configuration as shown in FIG. 3.

The trailer includes wheels 12 which support the trailer for rolling movement in a forward working direction 14 which comprises the longitudinal direction of the trailer. A hitch connector 16 is provided at a forward end of the trailer for connection to a towing vehicle 18 in a conventional manner.

Figure 5:
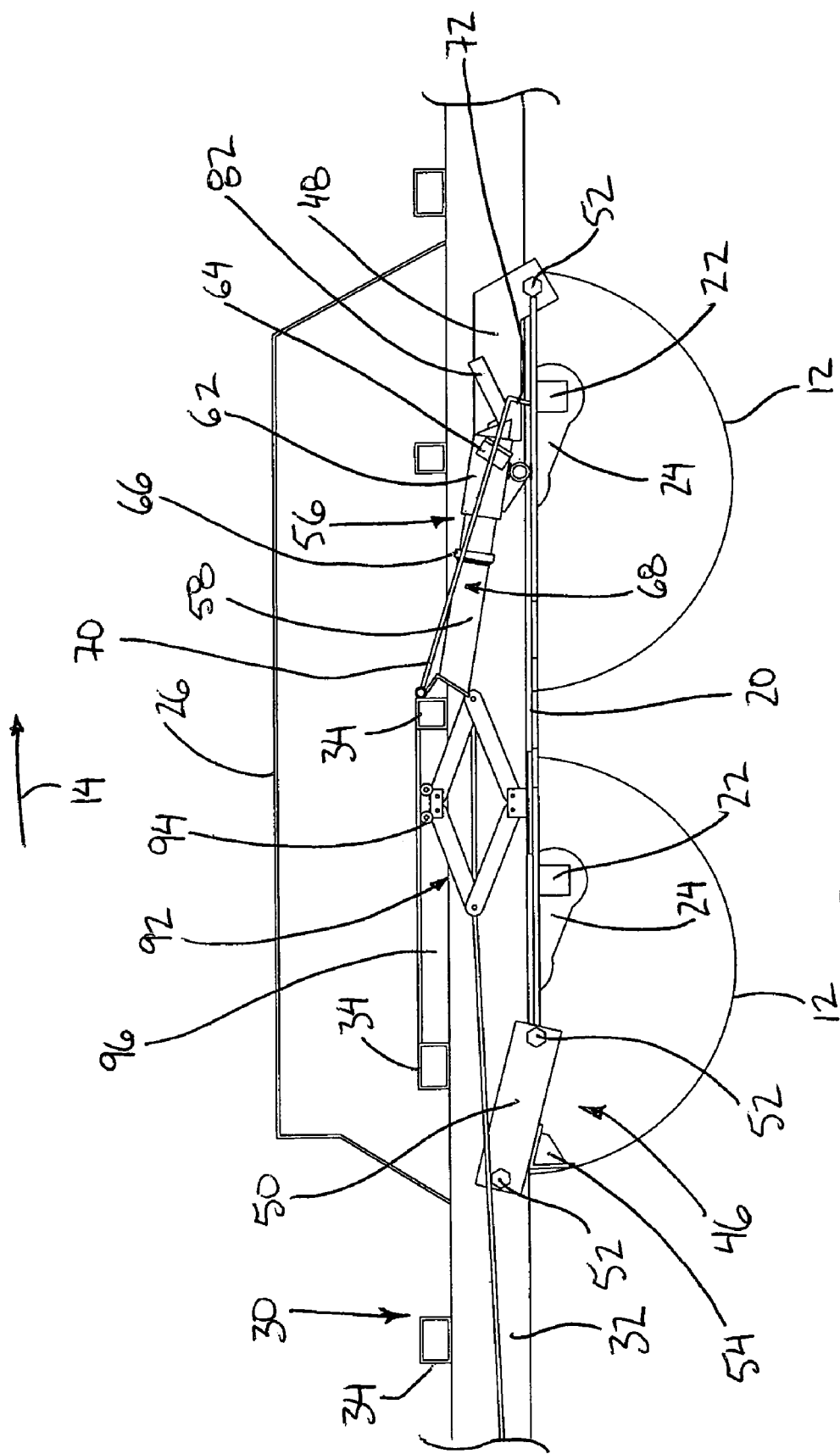
FIG. 5 is a partly sectional side elevational view of the linkage in the lowered transport position.
Figure 6:
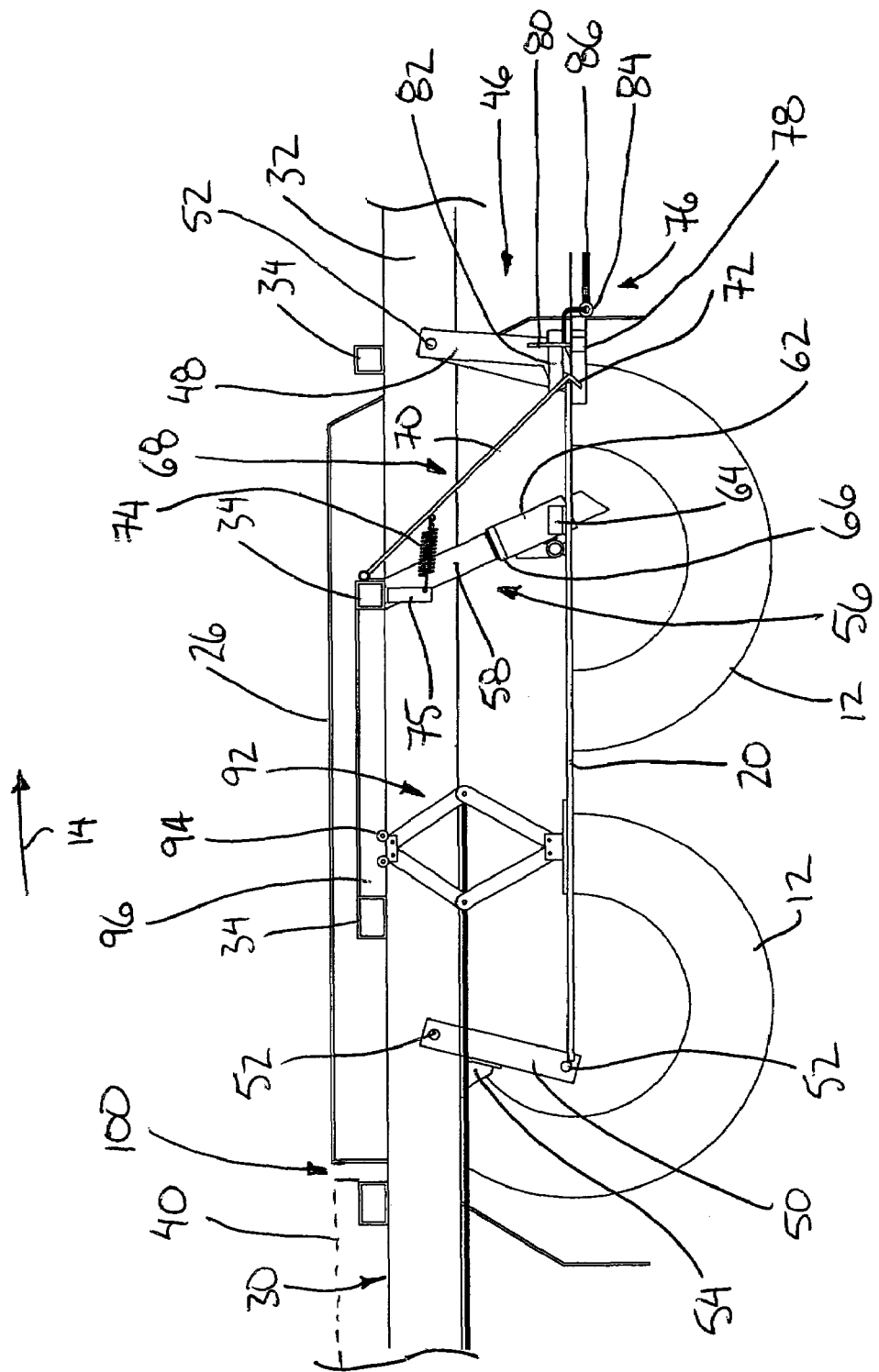
FIG. 6 is a partly sectional side elevational view of the linkage in the raised transport position.
Figure 7:
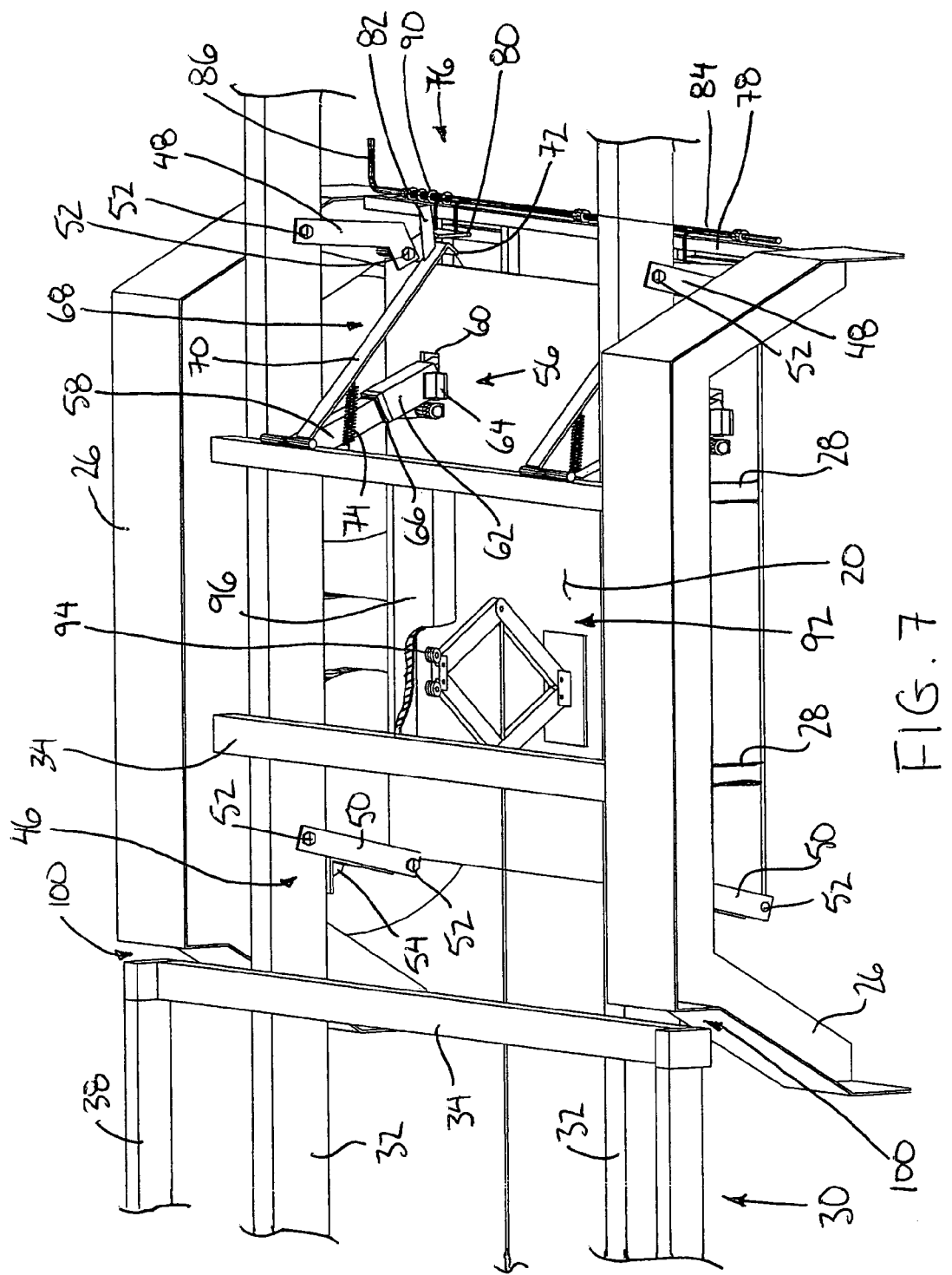
FIG. 7 is a perspective view of the linkage in the raised transport position.
Figure 8A:
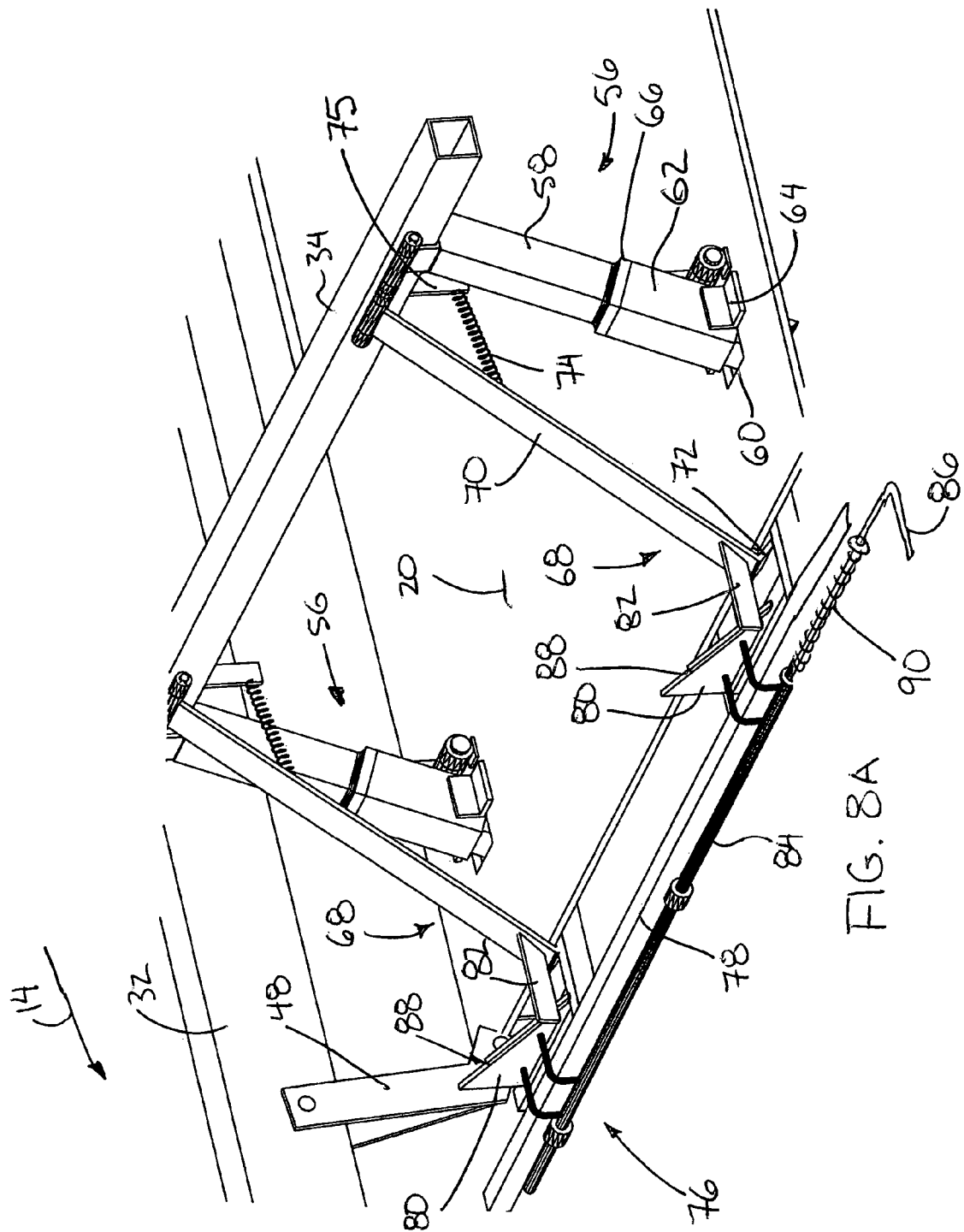
FIGS. 8A through 8C illustrate the sequence of the linkage being displaced between the raised transport position and the lowered transport position in perspective views of the latches being engaged, the latches being retained in a released position by the release mechanism and the latch and release mechanisms both being disengaged in the lowered transport position respectively.
Figure 8B:
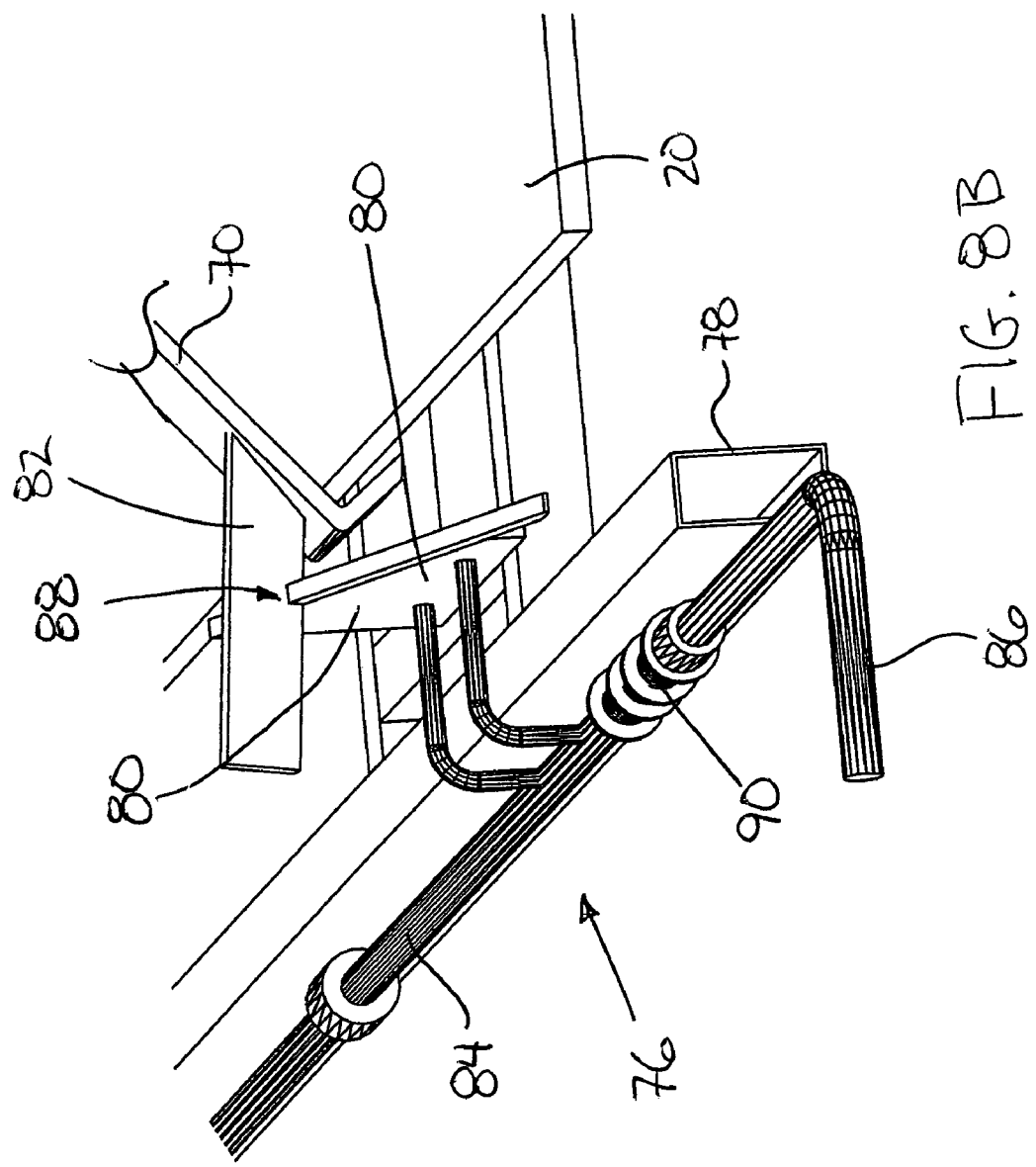
Figure 8C:
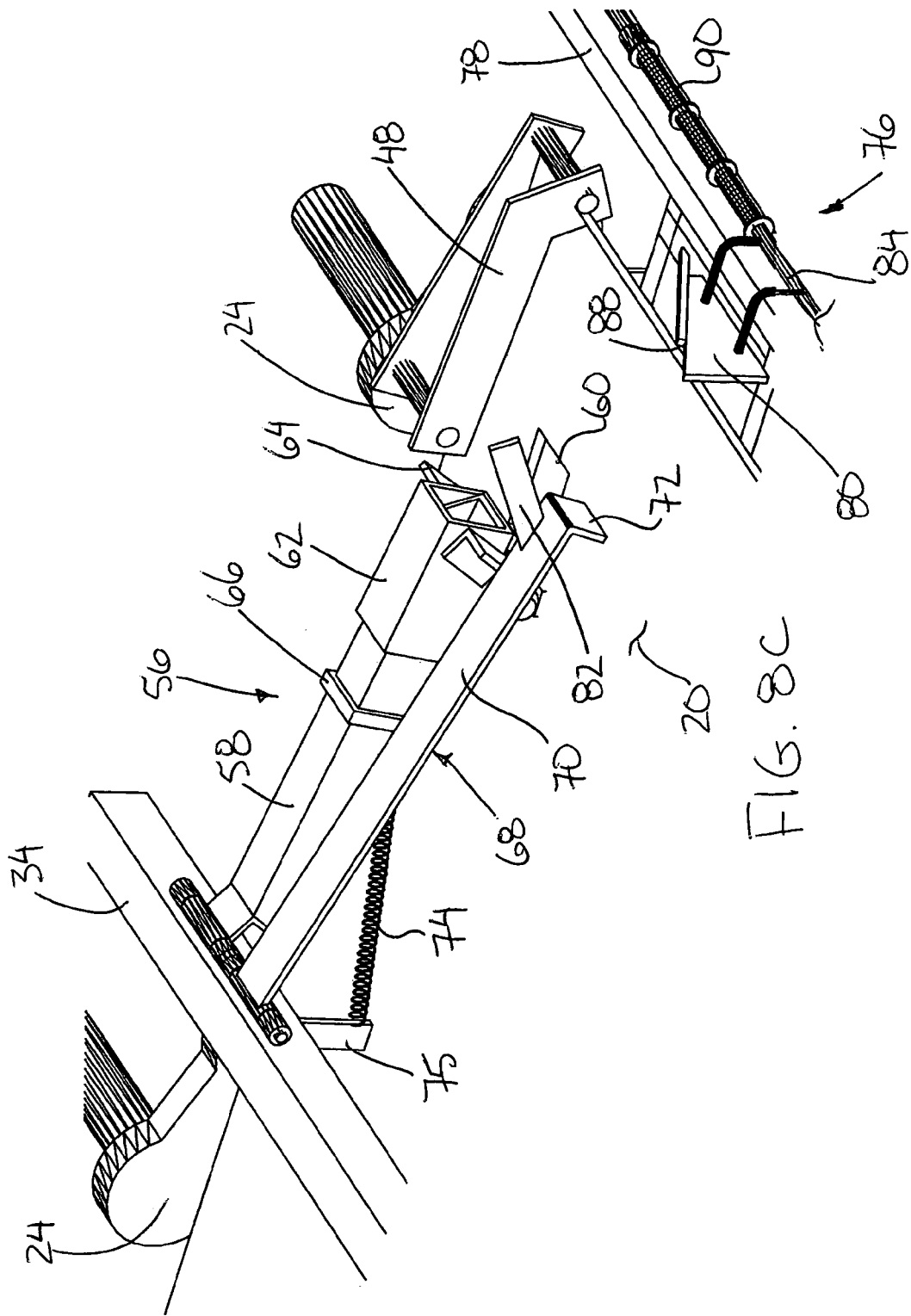

The trailer 10 comprises a base frame 20 in the form of a rigid rectangular plate which is supported horizontally to commonly span all of the wheels 12. Two torsion axles 22 are supported beneath the rectangular plate forming the base frame so that the axles are oriented parallel and spaced apart from one another perpendicular to the longitudinal forward direction of the trailer and such that the rigid plate is engaged directly on the torsion axles as shown in FIG. 5. Torsion arms 24 are supported at opposing ends of each torsion axle so as to extend radially therefrom to support a wheel axle of a respective wheel 12 thereon. Two pairs of wheels are thus supported by the axles 22 to support the base frame 20 thereon for rolling movement along the ground in the longitudinal forward direction of the trailer. The base frame 20 is substantially fixed in height in relation to the wheels 12 and the ground with the exception of the suspension travel of the wheels relative to the base frame as the torsion arms 24 are rotated about the respective longitudinal axes of the axles 22.

The base frame includes fenders 26 supported at opposing sides thereof to extend over the wheels 12 of the trailer. There is sufficient space provided between the top of the wheels and the underside of the fenders to provide clearance for suspension travel. The fenders 26 are fixed in relation to the base frame 20 by rigid struts 28 which support the fenders 26 to span laterally outwardly beyond the base frame spaced above the rectangular plate.

The trailer further comprises a deck frame 30 which is elongate in the longitudinal direction of the trailer. The deck frame includes two parallel beams 32 which are spaced apart the width of the base frame plate and which extend substantially the full length of the deck in the longitudinal direction. The beams 32 are joined by a plurality of crossbars 34 connected between the top sides of the beams to span therebetween at various longitudinally spaced positions.

The crossbars 34 are parallel to one another and perpendicular to the beams. At the wheels 12, the crossbars 34 have a length approximately equal to the width of the base frame 20 between the wheels which is in the order of 83 inches wide so that the overall width of the trailer including the wheels and fenders fits within the required maximum dimension for road transport regulations. Ahead of and behind the wheels in the longitudinal direction, the crossbars 34 extend beyond the beams at both ends thereof a full width between opposing exterior sides of the fenders. The deck frame 30 thus defines wing portions 36 ahead and behind the wheels 12 in the longitudinal direction of the trailer where the width of the trailer perpendicularly to the longitudinal direction is approximately 102 inches.

The deck frame 30 further includes side rails 38 which extend above the crossbars 34 at a perimeter of the deck frame 30 for retaining decking material 40 on top of the deck frame 30 which lies flush with the tops of the rails 38.

The hitch connector 16 comprises a hitch frame 42 which is pivotally connected at an inner end on the deck frame therebelow ahead of the wheels 12 of the trailer. A suitable tilt mechanism 44 is coupled between the hitch frame 42 and the front end of the deck frame for adjusting the relative spacing therebetween to tilt the deck frame in a conventional manner as shown in FIG. 3.

A linkage is provided which is coupled between the base frame and the deck frame to control the relative movement therebetween. The linkage comprises a parallel 4-bar linkage including two pairs of parallel links coupled between the common base frame supporting the wheels 12 thereon and the deck frame to which all of the links are connected.

Each pair of links is connected along a respective side of the base frame at longitudinally spaced positions so as to define a front link 48 at a front edge of the base frame adjacent the respective side and a rear link 50 pivotally coupled to a rear of the base frame adjacent the respective side. Each of the links 48 and 50 comprises a pair of parallel plates coupled at opposing ends of a pivot shaft 52 rotatably supported within a bearing housing on the base frame.

The links 48 and 50 are similarly coupled to the respective beams of the deck frame at longitudinally spaced positions in which the parallel plates forming the link are coupled to opposing ends of a pivot shaft 52 received within a bearing housing secured to the respective beam so that the plates lie in respective pivot planes receiving the beam therebetween. Distance between pivot points along each link and the orientation of all of the links are identical to one another so that the deck frame remains parallel to the base frame as the linkage 46 is rotated between the lowered transport position and the raised transport position of the trailer.

In the lowered transport position, the beams rest on the top side of the base frame so that the beams are engaged directly on the plate as shown in FIG. 5, and so that the deck frame and surface material thereon are below a height of the wheels 12. The links in this instance extend generally rearwardly from the pivot connection on the base frame to the pivot connection of the deck frame so that all of the links are near horizontal in orientation. Innermost plates of the front links 48 include a forward offset portion for extending over the front edge of the plate forming the base frame when the links are near horizontal. The front edge of the plate forming the base frame is also notched to partially receive the link therein in the lowered transport position.

The links are then pivoted upwardly and forwardly from the lowered transport position to the raised transport position so that the deck frame pivots in an arc like motion relative to the base frame and the wheels over-center and then slightly downwardly into the raised transport position. In the raised position, the beams are spaced higher in elevation above the base frame in relation to the lowered transport position so that the deck frame and decking material on a top surface thereof are substantially flush with a top side of the fender near but slightly above the wheel height of the wheels 12. The links in the raised transport position extend upwardly at a slight forward incline so as to be rotated over-center in relation to the lowered transport position.

Load supports are provided for supporting the deck frame in a load bearing position with a load thereon in both the lowered and raised transport positions so that the deck frame is horizontal and spaced above the ground and supported for rolling movement in the forward direction in both positions.

In the lowered transport position, the load supports comprise portions of the base frame along opposing longitudinally extending sides thereof which are directly below the beams of the deck frame so that once that the deck frame is lowered into engagement with the base frame, the portions of the base which are engaged by the beams prevent further downward pivoting movement of the links beyond the lowered transport position. Any loads supported on the deck frame are thus directly supported in the base frame and accordingly the wheels 12 through the torsion axles 22.

In the raised transport position, the load supports in part comprise stops 54 which are supported on the rear links 50 at a read side thereof. The stops 54 comprise an acute angle wedge rigidly fixed on the rear links near the pivot connection to the beams to span between the parallel plates defining the link. The stop 54 is thus aligned with the beam between the plates and directly thereabove to engage that beam when the link if pivoted to extend upwardly at a slightly forward incline in the raised transport position of the trailer. The stop 54 thus prevents further rotation of the links beyond the over-center raised transport position.

In the raised transport position, the load supports further comprise rigid support posts 56. Two posts 56 are provided at laterally spaced apart positions near the front of the base frame. Each post comprises a main portion 58 which is pivoted at a top end on a front face of a respective one of the crossbars 34 of the deck frame. The posts are pivoted about a common horizontal axis oriented perpendicularly to the longitudinal direction of the trailer. A cradle is formed at the upper end of the main portion 58 which closely fits to the cross section of the underside of the respective crossbar to distribute the weight from the crossbar onto the post.

At a lower end, the main portions 58 of the posts are received through respective openings 60 in the plate forming the base frame. A stop collar 62 slidably and telescopically receives the main portion 50 of each post 56 therein. The stop collar 62 is supported on a respective pivot shaft at a rear side thereof and at a rear side of the respective opening 60 for aligning the stop collar 62 with the opening 60 when the collar is pivoted into a generally upright orientation. The stop collars 62 are similarly pivoted about a respective common axis extend laterally across the frame perpendicularly to the longitudinal direction of the trailer. The posts 56 are thus arranged to be telescopically extended by slidably displacing the main portion 58 within the respective stop collar 62 as the deck frame is pivoted in relation to the base frame.

Stop flanges 64 are provided at the base of the stop collar 62 for engaging the plate defining the base frame surrounding the opening 60 when the stop collar is substantially upright at a rearward angle in the raised transport position of the trailer. The stop flanges 64 prevent further forward rotation of the stop collars 62 forwardly and downwardly beyond the raised transport position.

Stop flanges 66 are also provided on the main portion 58 of the rigid posts for engaging the top side of the respective stop collar 62 when the rigid posts are retracted in the raised transport position of the trailer. The stop flanges 64 and 66 permit weight carried on the deck frame to be transmitted to the main portion of the post through the cradle and subsequently to the stop collar 62 by the stop flanges 66 and then the base frame by the stop flanges 64. The rigid support posts 56 in the raised transport position are sloped downwardly and forwardly in the direction of movement of the deck frame towards the raised transport position, from the deck frame to the base frame. The rigid posts are strong enough to resist downward force of the load of the deck frame to prevent further pivoting of the linkage beyond the raised transport position. Alternatively, when returning the deck frame back to the lowered transport position, the stop flanges 64 and 66 do not interfere with the rigid posts 56 being telescopically extended as the deck frame is pivoted from the raised transport position rearwardly towards the lowered transport position.

A latch mechanism 68 is provided to latch the deck frame in the raised position as desired. The latch mechanism generally comprises two latches 70 which are spaced laterally apart along the front of the base frame. Each latch is pivoted at a rear end on a respective one of the crossbars 34 of the deck frame to extend downwardly and forwardly towards the front edge of the base frame. A hook flange 72 is provided at a lower free end of each latch 70. The hook flange 72 is oriented generally tangentially to the pivot axis which extends commonly between the rear pivots of each the latches 70 so that the hook flanges can be readily released simply by pivoting the latches about the respective pivot axis.

A spring 74 is coupled under tension between each latch 70 at an intermediate location therealong to a respective anchor 75 spaced below the crossbar 34 supporting the latches pivotally thereon. The springs thus act to bias the latches downwardly into engagement with the base frame at the free ends thereof. The hook flanges extend downwardly and slightly rearwardly in use for overlapping the front edge of the plate forming the base frame in a latched position.

A release mechanism 76 is provided for commonly releasing all of the latches 70 simultaneously and for selectively maintaining the latches in a released position disengaged from the base frame. The release mechanism comprises a carrier bar 78 extending laterally ahead of the base frame for supporting pair of ramp members 80 slidably thereon in alignment with the latches 70 respectively. Each of the ramp members 80 includes a top camming face which extends at an upward incline in a common lateral direction for engaging respective followers 82 supported on the latches 70. Each follower 82 comprises a bar projecting generally forwardly from the free end of the latch adjacent the hook flange.

A common actuator rod 84 is coupled between the ramp members 80 for common sliding movement therewith in a lateral direction. A handle 86 at one end of the rod permits the rod to be gripped and displaced laterally from an engaged position of the latch mechanism to a released position of the latch mechanism. In doing so, the followers 82 are slidably displaced along the upwardly sloped top camming face of the ramp members to urge the latches 70 to be pivoted upwardly about the pivot axis at the rear thereof sufficiently that the hook flanges are released from the forward edge of the base frame.

Each camming surface of the ramp members includes a catch 88 formed thereon in the form of a notch so that upon riding up the ramp surface, the biasing of the latches ensures that the followers remain in contact with downward pressure on the camming face to engage the followers downwardly into the respective notches forming the catches 88 and thereby prevent return sliding of the followers back down the camming face. Accordingly the latches are prevented from pivoting back downwardly into the engaged position and are maintain released by the release mechanism.

Moving the deck frame rearwardly in relation to the base frame from the raised transport position to the lowered transport position causes the followers on the latches to be displaced rearwardly with the deck frame pivotally carrying the latches thereon until followers are released from the ramp members. At this point the hook flanges overlap the top side of the base frame and continue moving rearward with displacement towards the lowered transport position to prevent the latches from being engaged. A spring 90 is provided on the common actuator rod 84 which is compressed as the rod is pulled into the released position of the latches. Once the followers are caught within the notches on the camming face of the ramp members, the spring 90 is held in a compressed condition, but as soon as the followers are displaced rearwardly with the respective latches into the lowered position, the followers are released from the respective catches 88 and the spring 90 biases the common actuator rod of the release mechanism 76 back into a position which permits the latch members to be returned to the latched and engaged position.

A lift mechanism 92 is supported for being operatively connected between the deck frame and the base frame to assist in lifting the deck frame from the lowered transport position to the raised transport position. The lift mechanism comprises as screw jack which is fixed onto the base frame at an intermediate location towards the rear of the base frame. Rollers 94 are provided at a top end of the screw jack for rolling contact within a corresponding channel 96 on the base frame which extends in the longitudinal direction of the trailer between a respective pair of the crossbars 34 of the deck frame. The rollers 94 accommodate for longitudinal displacement of the deck frame in relation to the base frame as it is pivoted upwardly by the linkage in an arc like motion from the lowered transport position to the raised transport position. A socket connection 98 is provided at the rear end of the deck frame for connection to the screw jack by suitable drive shaft so that any rotary power tool can be connected to the socket connection 98 to drive rotation of the screw jack for raising and lowering the lift mechanism as desired.

When initially in the lowered transport position, the deck frame rests on the base frame with the links of the parallel 4-bar linkage extending generally rearwardly from the base frame to the deck frame. The screw jack in this instance is collapsed between the base frame and the channel 96 within the deck frame. Due to the low angle of the links, a very large force in the longitudinal horizontal direction would be required to rotate the links forwardly towards the raised transport position, and thus the deck frame is safely supported directly on the base frame in the lowered transport position.

In order to lift the deck frame from the lowered transport position, the lift mechanism is used to increase the vertical spacing between the deck frame and the base frame and pivot the links into a more upright configuration. Once the links are in a more upright configuration, a towing force in the longitudinal direction is then capable of pivoting the links over-centre to the raised transport position and back.

In extending the lift mechanism, vertical forces applied to the deck frame and the arcing motion towards the raised position begins at which point the rollers assume rolling contact within the channel in the deck frame. As the links approach a near vertical orientation extending at an upward and rearward incline, the user may brake the wheels of the trailer as the trailer is provided with conventional trailer brakes operable independently of the towing vehicle brakes, but actuatable from within the towing vehicle. Towing the deck frame forwardly with the base frame being fixed by the braked wheels in the longitudinal direction permits the linkage to be rotated over center by first displacing the deck frame upwardly and forwardly and then downwardly and forwardly at which point the weight of the deck frame is removed from the lift mechanism and transferred onto the load supports in the form of the stops 54 and the rear links and the rigid posts 56.

The lift mechanism may be maintained in a raised lifting position for convenience of subsequent reverse of the trailer back into the lowered transport position, however the deck frame is fully separated from the lift mechanism in the raised transport position and carries no weight on the lift mechanism as all of the weight is independently supported by the load supports. Once displaced towards the raised transport position, the springs of the latches 70 urge the hook flanges of the latches downwardly over top of the front edge of the base frame to effectively latch the deck frame in the raised transport position and prevent return of the deck frame into the lowered transport position as rearward movement of the deck frame relative to the base frame is prevented by the latches.

To return the trailer to the lowered transport position from the raised transport position, the release mechanism 76 is activated pulling on the common actuator rod 84 until the followers of the latches are displaced upwardly by the respective camming surfaces of the ramp members 80 until the followers are maintained in a released position by the catches 88 respectively. By similarly breaking the wheels on the trailer, the towing vehicle can displace the deck frame rearwardly relative to the base frame and thereby rotate the linkage rearwardly over center first upwardly, then downwardly back onto the screw jack of the lift mechanism 92. By maintaining the lift mechanism 92 in a raised and extended position, the deck frame falls only slightly downward and rearward from the over center position to an engaged position supported on the lift mechanism. The lift mechanism can then be lowered until the links are oriented substantially horizontally again with the weight of the deck frame being fully engaged directly upon the base frame.

For safety reasons, the wing portions of the deck frame are positioned sufficiently ahead and sufficiently rearward of the respective wheels that a clearance gap 100 is defined between the fenders and the wing portions of the deck frame both at the front and rear sides of the fender in both the raised and lowered transport positions. Maintaining the lift mechanism extended while the trailer is in the raised transport position also contributes to safety as the deck frame falls only slightly downwardly from the over-center position onto the lift mechanism when returning towards the lowered transport position. When other lift mechanisms are used, for example a hydraulic jack, it is desirable to configure the lift mechanism to remain extended during the raised transport position. In a hydraulic system, a valve may be connected in series with the drain of the hydraulic lift to force a long slow draining and retraction of the hydraulic lift when returning towards the lowered transport position.

As described herein, a trailer is provided which can be used in either a deck between configuration or a deck over configuration. The advantages of a low loading height of a deck between configuration and the advantages of a trailer including a deck which is flush the wheel wells so to have an uninterrupted deck surface as in a deck over configuration, can both be realised with a single purchase by the consumer.

In further embodiments, the latch mechanism may be provided with a locking mechanism to prevent release by unauthorized persons. In the simplest form, the locking mechanism may comprise overlapping co-operating apertures for receiving a padlock type locking member.

The trailer can be made available to support loads ranging from 1000 pounds to 21,000 pounds by varying the number of axles. When 3 axles are provided, additional links or load supports, such as the rigid posts noted above, can also be provided to safely support the load in both raised and lowered positions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A trailer comprising:
   a hitch connector arranged for connection to a towing vehicle which is arranged to tow the trailer;
   a deck frame including decking material on a top side of the deck frame arranged for bearing a load thereon;
   a base frame supported on a plurality of wheels so as to be arranged for rolling movement along the ground;
   a set of fenders supported in fixed relation on the base frame and arranged to extend over the plurality of wheels;
   a linkage supporting the deck frame on the plurality of wheels so as to be arranged for relative movement between a lowered transport position and a raised transport position;
   the deck frame being spaced above the ground such that the decking material of the deck frame is spaced below a height of the wheels and the fenders in the lowered transport position;
   the deck frame being spaced above the ground above the height of the wheels such that a top side of the decking material is flush with a top side of the fenders in the raised transport position;
   the linkage supporting the deck frame such that the deck frame is movable relative to the wheels upwardly and forwardly from one of the transport positions towards an over-centre location and such that the deck frame is movable relative to the wheels downwardly and forwardly from the over-centre location to the other one of the transport positions; and
   load supports supporting the deck frame on the wheels so as to be arranged to bear the load on the deck frame for rolling movement along the ground on the wheels in both the lowered transport position and the raised transport position.

2. The trailer according to claim 1 wherein the linkage comprises a 4-bar linkage coupled between the base frame and the deck frame.

3. The trailer according to claim 1 wherein the linkage is coupled between the deck frame and the base frame and the load supports comprise a portion of the base frame which supports the deck frame directly thereon in the lowered transport position.

4. The trailer according to claim 1 wherein the linkage comprises a 4-bar linkage including pivoting links which are arranged to be near horizontal in the lowered transport position.

5. The trailer according to claim 4 wherein there is provided a lift mechanism arranged for lifting the deck frame in the lowered position relative to the base frame.

6. The trailer according to claim 5 wherein the load supports support the deck frame so as to be arranged for bearing a load independently of the lift mechanism such that no weight is carried on the lift mechanism in the raised transport position.

7. The trailer according to claim 1 wherein the linkage comprises a 4-bar linkage and the load supports comprise stops which are arranged to prevent rotation beyond the raised transport position.

8. The trailer according to claim 1 wherein the linkage is arranged to pivot the deck frame in relation to the wheels generally upwardly and forwardly from the lowered transport position to the over-centre location and generally downwardly and forwardly from the over-centre location to the raised transport position.

9. The trailer according to claim 8 wherein the wheels are supported on a base frame and wherein the load supports comprise rigid posts extending downwardly and forwardly from the deck frame to the base frame in the raised transport position, the rigid posts being arranged for preventing rotation of the linkage beyond the raised transport position.

10. The trailer according to claim 1 wherein there is provided a latch mechanism arranged for latching the deck frame in the raised transport position and wherein the latch mechanism is biased into latching engagement.

11. The trailer according to claim 10 wherein the latch mechanism comprises a plurality of latch members operatively connected to a common release mechanism arranged for simultaneously releasing engagement of all of the latch members.

12. The trailer according to claim 1 wherein the hitch connector is supported on the deck frame.

13. The trailer according to claim 1 wherein the wheels are connected to the base frame by respective torsion axles.

14. The trailer according to claim 1 wherein the deck frame includes wing portions extending outward at respective locations ahead of and behind the plurality of wheels respectively and wherein there is provided a clearance gap in a longitudinal direction of the trailer between the fenders and the wing portions of the deck frame in both the lowered transport position and the raised transport position.

15. The trailer according to claim 1 wherein the linkage comprises a parallel 4-bar linkage which is arranged to maintain the deck frame in horizontal orientation in both the lowered transport position and the raised transport position.

16. The trailer according to claim 1 wherein the linkage comprises links pivotally coupled between a base frame supporting the wheels thereon and the deck frame, the links extending upwardly at a forward incline in the raised transport position.

17. A trailer comprising:
a hitch connector arranged for connection to a towing vehicle which is arranged to tow the trailer;
a deck frame arranged for bearing a load thereon;
a base frame supported on a plurality of wheels;
a linkage supporting the deck frame on the base frame on the wheels so as to be arranged for movement relative to the base frame and the wheels between a lowered transport position in which the deck frame is spaced above the ground below a height of the wheels and a raised transport position in which the deck frame is spaced above the ground substantially at or above the height of the wheels;
load supports supporting the deck frame on the base frame on the wheels so as to be arranged to bear a load on the deck frame for rolling movement along the ground on the wheels in both the lowered transport position and the raised transport position;
the load supports comprising rigid posts extending downwardly and forwardly from the deck frame to the base frame in the raised transport position;
the rigid posts being arranged for preventing rotation of the linkage beyond the raised transport position;
the rigid posts being slidably extended in the lowered transport position in relation to the raised transport position; and
the linkage being arranged to pivot the deck frame in relation to the base frame on the wheels upwardly and forwardly from the lowered transport position to the raised transport position.

18. A trailer arranged for towing connection to a towing vehicle which is arranged to tow the trailer along the ground in a forward working direction, the trailer comprising:
a hitch connector arranged for towing connection to the towing vehicle;
a deck frame comprising a pair of beams extending generally in the forward working direction and a plurality of cross members extending between the pair of beams, and including decking material on a top side of the deck frame arranged for bearing a load thereon;
a pair of torsion axles parallel and spaced apart from one another so as to be perpendicular to the forward working direction:
a base frame consisting of a horizontally spanning rigid plate commonly supported directly on the torsion axles;
a plurality of wheels supported on respective torsion arms extending radially outward from opposing ends of the torsion axles so as to be arranged for rolling movement in the forward working direction;
a linkage coupled between the deck frame and the rigid plate of the base frame so as to support the deck frame on the base frame on the plurality of wheels and so as to be arranged for movement of the deck frame relative to the base frame between a lowered transport position and a raised transport position;
the deck frame being supported directly on a top side of the rigid plate of the base frame and spaced above the ground such that the decking material of the deck frame is spaced below a height of the wheels in the lowered transport position;
the deck frame being supported by the linkage spaced above the rigid plate of the base frame and spaced above the ground such that the decking material is above the height of the wheels in the raised transport position;
the linkage supporting the deck frame such that the deck frame is movable relative to the base frame on the wheels upwardly and forwardly from one of the transport positions towards an over-centre location and such that the deck frame is movable relative to the wheels downwardly and forwardly from the over-centre location to the other one of the transport positions; and
load supports supporting the deck frame on the wheels so as to be arranged to bear the load on the deck frame for rolling movement along the ground on the wheels in both the lowered transport position and the raised transport position.

19. The trailer according to claim 18 wherein the pair of beams of the deck frame are engaged directly on the top side of the rigid plate in the lowered transport position.

20. A trailer arranged for towing connection to a towing vehicle which is arranged to tow the trailer along the ground in a forward working direction, the trailer comprising:
a hitch connector arranged for towing connection to the towing vehicle;
a deck frame comprising a pair of beams extending generally in the forward working direction and a plurality of cross members extending between the pair of beams, and including decking material on a top side of the deck frame arranged for bearing a load thereon;
a base frame supported on a plurality of wheels so as to be arranged for rolling movement along the ground in the forward working direction;
a linkage supporting the deck frame on the base frame so as to be arranged for movement of the deck frame relative to the base frame and the wheels upon which the base frame is supported between a lowered transport position and a raised transport position;
the deck frame being supported on the base frame such that the deck frame is supported on a top side of the base frame in the lowered transport position and spaced above the ground such that the decking material of the deck frame is spaced below a height of the wheels in the lowered transport position;
the deck frame being supported by the linkage spaced above the base frame and spaced above the ground such that the decking material is above the height of the wheels in the raised transport position;
the linkage supporting the deck frame such that the deck frame is movable relative to the wheels upwardly and forwardly from one of the transport positions towards an over-centre location and such that the deck frame is movable relative to the wheels downwardly and forwardly from the over-centre location to the other one of the transport positions; and
load supports supporting the deck frame on the wheels so as to be arranged to bear the load on the deck frame for rolling movement along the ground on the wheels in both the lowered transport position and the raised transport position;
the hitch connector being supported on the deck frame so as to be arranged for movement with the deck frame relative to the base frame and the wheels upon which the base frame is supported between the lowered transport position and the raised transport position.

* * * * *